US008777552B2

(12) United States Patent
Ward et al.

(10) Patent No.: US 8,777,552 B2
(45) Date of Patent: Jul. 15, 2014

(54) SYSTEM AND METHODS FOR FORMING STACKS

(75) Inventors: Christopher Ward, Mol (BE); Craig Gendreau, Spokane, WA (US)

(73) Assignee: J&L Group International, LLC, Keithville, LA (US)

( * ) Notice: Subject to any disclaimer, the term of this patent is extended or adjusted under 35 U.S.C. 154(b) by 0 days.

(21) Appl. No.: 13/036,537

(22) Filed: Feb. 28, 2011
(Under 37 CFR 1.47)

(65) Prior Publication Data
US 2012/0039699 A1    Feb. 16, 2012

Related U.S. Application Data

(63) Continuation of application No. 12/837,281, filed on Jul. 15, 2010, now abandoned.

(60) Provisional application No. 61/228,873, filed on Jul. 27, 2009.

(51) Int. Cl.
| B25J 15/00 | (2006.01) |
| B65G 57/24 | (2006.01) |
| B65G 57/00 | (2006.01) |
| B25J 17/02 | (2006.01) |
| B65H 31/30 | (2006.01) |
| B65G 47/08 | (2006.01) |
| B25J 15/02 | (2006.01) |
| B65G 47/90 | (2006.01) |
| B65G 57/26 | (2006.01) |
| B65G 61/00 | (2006.01) |

(52) U.S. Cl.
CPC ............ B25J 15/0052 (2013.01); B65G 57/24 (2013.01); B65G 57/00 (2013.01); B25J 17/0241 (2013.01); B65H 31/3081 (2013.01); B65G 47/086 (2013.01); B65G 2814/0307 (2013.01); B25J 15/0253 (2013.01); B65G 47/907 (2013.01); B65G 57/26 (2013.01); B65G 61/00 (2013.01); B25J 15/0061 (2013.01); Y10S 414/114 (2013.01)
USPC ............ 414/799; 414/623; 414/736; 414/900

(58) Field of Classification Search
USPC ............ 294/119.1, 86.4; 414/222.01, 222.04, 414/222.07, 223.01, 223.02, 225.01, 414/226.02, 331.09, 623, 736, 751.1, 752.1, 414/753.1, 763, 783, 788, 791.6, 791.7, 414/791.8, 792.4, 792.5, 792.6, 792.7, 414/792.9, 793, 796.9, 797, 799, 900, 931; 53/447, 537, 543
See application file for complete search history.

(56) References Cited

U.S. PATENT DOCUMENTS 3,601,266 A * 8/1971 Pearne et al. .................. 414/796
3,951,283 A * 4/1976 Lingl, Jr. ...................... 414/802
(Continued)

FOREIGN PATENT DOCUMENTS

EP    0 498 263    8/1992
EP    0 511 529    11/1992
(Continued)

Primary Examiner — Gregory Adams
(74) Attorney, Agent, or Firm — Dorsey & Whitney LLP; Kenneth E. Levitt, Esq.

(57) ABSTRACT

A method of forming layered stacks of bundles includes providing a gripping appliance comprising a first gripping assembly and a second gripping assembly. The first gripping assembly is configured for grasping one or more first bundles and the second gripping assembly is configured for grasping one or more second bundles. The first and second gripping assemblies are configured such that first and second bundles grasped thereby may be reoriented relative to one another. The method further includes retrieving from a first location one or more first bundles with the first gripping assembly and one or more second bundles with the second gripping assembly and transporting the first and second bundles to a second location, During transport of the first and second bundles, the bundles are reoriented relative to one another. The bundles are deposited at a selected position in the second location to form at least a partial layer of a layered stack of bundles.

18 Claims, 8 Drawing Sheets

(56) References Cited

U.S. PATENT DOCUMENTS

| | | | |
|---|---|---|---|
| 4,155,467 A * | 5/1979 | Lingl | 414/789.6 |
| 4,164,296 A * | 8/1979 | Trees | 414/416.02 |
| 4,444,424 A * | 4/1984 | Lebret | 294/87.1 |
| 4,686,813 A * | 8/1987 | Sawada | 53/446 |
| 4,850,783 A * | 7/1989 | Maekawa | 414/792.9 |
| 5,263,813 A * | 11/1993 | Kiederle et al. | 414/792.9 |
| 5,348,440 A | 9/1994 | Focke | |
| 5,651,659 A * | 7/1997 | Myers et al. | 414/814 |
| 6,290,448 B1 | 9/2001 | Focke | |

FOREIGN PATENT DOCUMENTS

| | | |
|---|---|---|
| EP | 0 949 169 | 10/1999 |
| EP | 1 837 134 | 9/2007 |

\* cited by examiner

SYSTEM AND METHODS FOR FORMING STACKS

CROSS-REFERENCE TO RELATED APPLICATIONS

This application is a continuation of U.S. patent application Ser. No. 12/837,281, filed Jul. 15, 2010, now abandoned which claims benefit of priority to U.S. Provisional Application No. 61/228,873 filed Jul. 27, 2009, the contents of which are herein incorporated by reference.

FIELD OF THE INVENTION

The present disclosure relates to systems and methods for automated formation of layered stacks of bundled objects. More particularly, the present disclosure relates to systems and methods for orienting and positioning a plurality of bundled objects during transport from a first location to a second location to form layered stacks of bundled objects.

BACKGROUND

Manufacturers of corrugated paper products, such as corrugated boxes, trays and flat corrugated sheets, typically arrange their product in bundles. The bundles are arranged in layers, or tiers, and stacked vertically to form loads of the product for transportation to customers. To facilitate load stability, the bundles which comprise each layer are often positioned in a pattern such that at least one of the bundles is rotated 90 degrees relative to the other bundles of the layer. The load is usually stacked on a pallet and banded together to facilitate handling of the load.

Various load forming systems have been developed. Specifically, in one system, bundles are transported one at a time by a transport device that can rotate the bundle during transport to a stack build area and place it on a stack in a desired position. In a further system, prior to retrieval by a transport device, a conditioning device orients bundles into a desired position. The bundle is then transported in this position to a stack build area. In still further systems, multiple conditioning devices are used to orient a series of bundles into a layer or partial layer prior to retrieval by a transport device. The layer or partial layer is then transported to a stack build area.

Heretofore, no system has been developed for retrieving a plurality of bundles and reorienting the bundles relative to one another during transport of the bundles to a stack build area.

BRIEF SUMMARY OF THE INVENTION

In one embodiment, a method may comprise providing a gripping appliance comprising a first gripping assembly and a second gripping assembly. The first gripping assembly may be configured for grasping one or more first bundles and the second gripping assembly may be configured for grasping one or more second bundles. The first and second gripping assemblies may be configured such that first and second bundles grasped thereby may be reoriented relative to one another. The method may further include retrieving from a first location one or more first bundles with the first gripping assembly and one or more second bundles with the second gripping assembly, transporting the first and second bundles to a second location, wherein during transporting of the first and second bundles, the first and second bundles are reoriented relative to one another, and depositing the first and second bundles at a selected position in the second location to form at least a partial layer of a layered stack of bundles.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

The present disclosure relates to systems and methods for automated formation of layered stacks of bundled objects. More particularly, the present disclosure relates to systems and methods for orienting and positioning a plurality of bundled objects during transport from a first location to a second location to form layered stacks of bundled objects.

The systems and methods disclosed herein may be used, for example, by manufacturers of corrugated paper products to more efficiently arrange bundles of the products into layered stacks. For example, the systems and methods disclosed herein may increase the rate at which stacks are formed as well as reduce the overall footprint of the machinery required to produce the stacks.

Figure 1:
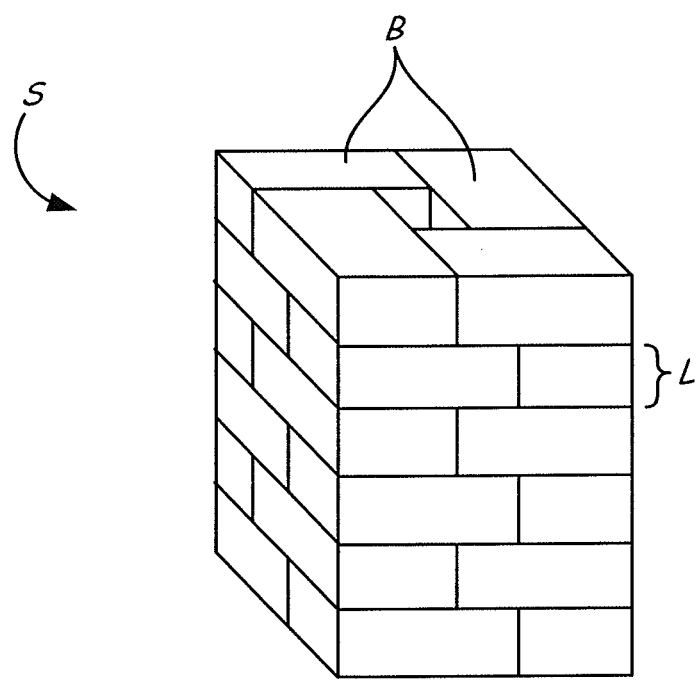
FIG. 1 is a perspective view of a stack of individual bundles.

FIG. 1 illustrates a perspective view of a stack S of individual bundles B, of a type which may be formed by employing the systems and methods disclosed herein. As shown, the bundles B are gathered in groups forming individual tiers or layers L, successively placed one upon another to form the stack S. The layers L are defined by an arrangement of individual bundles B wherein at least one bundle B may be rotated relative to the other bundles of a layer L. The arrangement of the bundles B which comprise a layer L may be referred to as the layer pattern. As the stack S is formed, the layer patterns may vary, such as by alternating layer patterns in adjacent layers. As will be recognized by those skilled in the art, bundle arrangement in this manner may increase the stability of the stack S. It is to be appreciated that the layer and stack patterns depicted in FIG. 1 are provided by way of illustration only, and that any desired layer or stack patterns are within the scope of the present disclosure.

Figure 2:
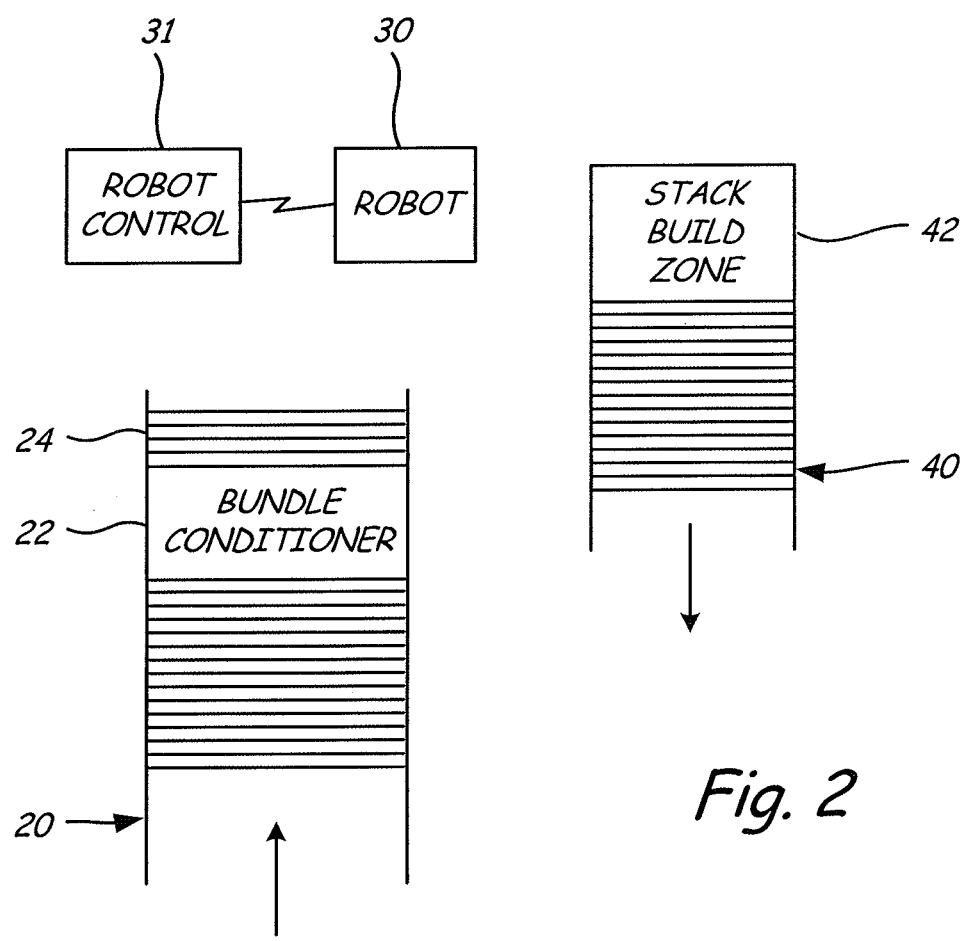
FIG. 2 is a schematic of an exemplary system environment for carrying out the systems and methods of the present disclosure.

FIG. 2 illustrates an exemplary system environment 10 for carrying out the systems and methods of the present disclosure. The system environment 10 may include a bundle conveyor 20 having an associated bundle conditioner 22 and bundle acquisition zone 24, a robot 30 operatively connected to a robot control 31, and a stack conveyor 40 having an associated stack build zone 42.

In some embodiments, the bundle conveyor 20 may be configured and operable for transferring bundles of material through the bundle conditioner 22 and to the bundle acquisition zone for retrieval by the robot 30. In one implementation, the bundles may comprise sheets of paper or corrugated material of selected length and width stacked into bundles of a selected height. Alternatively, the bundles may comprise any stackable objects such as, for example, boxes, crates, bags, bales, discrete stacks of articles, individual products, and the like.

In various embodiments, the bundle conditioner 22 may orient one or more bundles in a selected position to facilitate retrieval of the bundles by the robot 30 in the bundle acquisition zone 24. For example, the bundle conditioner 22 may include a centering unit for aligning bundles that are being moved on the conveyor 20 and are off center or rotated. In one embodiment, the bundle conditioner 22 may be configured to position the bundles such that rows of bundles (i.e., two or more bundles substantially aligned in a direction normal to the conveying direction of the conveyor) are transferred to the bundle acquisition zone 24 with each bundle being oriented substantially "head to tail" (i.e., the longitudinal dimension of each bundle is substantially parallel to the conveying direction of the conveyor 20). Alternatively, the bundles conditioner 22 may be configured to orient the bundles in any selected position.

In various implementations, the robot 30 may include a movable arm having a gripping appliance attached thereto, which will be discussed in more detail with respect to FIGS. 3-5, configured for gripping and carrying bundles to a selected location such as, for example, a stack build zone. An example of a suitable robot that may be used for the robot 30 is the Fanuc M410i series, commercially available from Fanuc Robotics of Rochester Hills, Mich.

In some embodiments, the robot 30 may be operatively associated with a robot control 31. The robot control 31 may include a computer having, for example, a processor, memory, monitor, input device, and the like. As is known, the memory may store a program of instructions that are executed by the processor. The robot control 31 may communicate the instructions to the robot 30, thereby causing the robot 30 to perform specified functions, which will be discussed in more detail below with respect to FIGS. 7-8.

In illustrative embodiments, stack conveyor 40 may be configured and operable for transferring finished stacks away from the stack build zone 42. In one embodiment, stack build zone 42 may be positioned proximate to a bottom sheet conveyor for transferring bottom sheets to the stack build zone 42 prior to new stacks being initiated.

Figure 3:
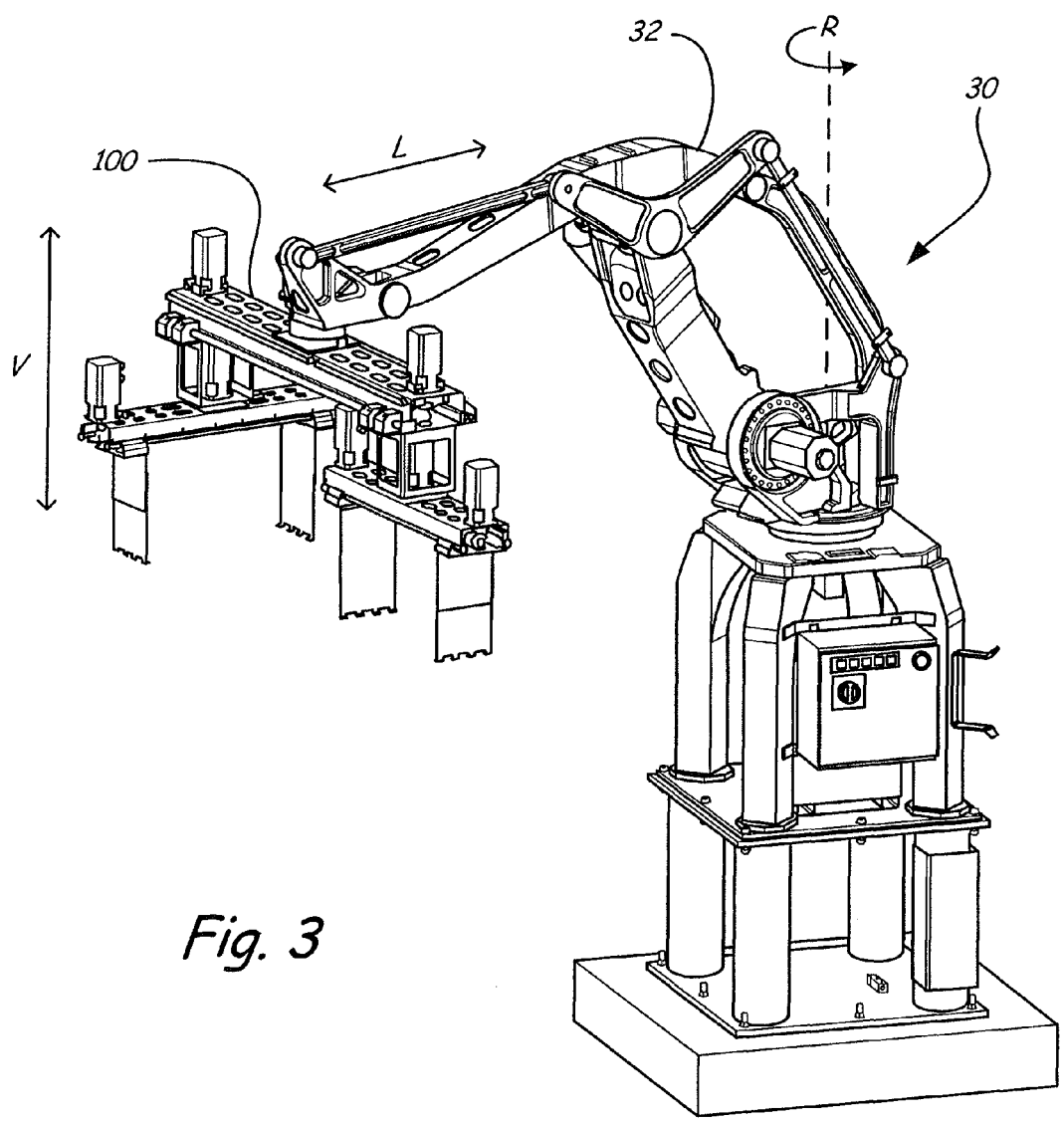
FIG. 3 is an isometric view of a robot suitable for loading bundles onto layered stacks in accordance with some embodiments.

FIG. 3 is an isometric view of a robot 30 suitable for loading bundles onto layered stacks in accordance with some embodiments. The robot 30 may include a movable arm 32 having a gripping appliance 100 affixed to an end thereof such that the gripping appliance 100 can be moved by the movable arm 32 to retrieve and/or place objects in a selected orientation at a selected location. For example, as indicated by the directional arrows of FIG. 3, the movable arm 32, and thus gripping appliance 100 coupled thereto, may be configured for vertical movement, lateral movement, and rotational movement about an axis R relative to the environment supporting the robot 30. In one embodiment, the robot 30, along with gripping appliance 100, may be employed to retrieve one or more bundles from a bundle acquisition zone, reorient the bundles with respect to one another during transport, and deposit the reoriented bundles in a stack build zone.

Figure 4:
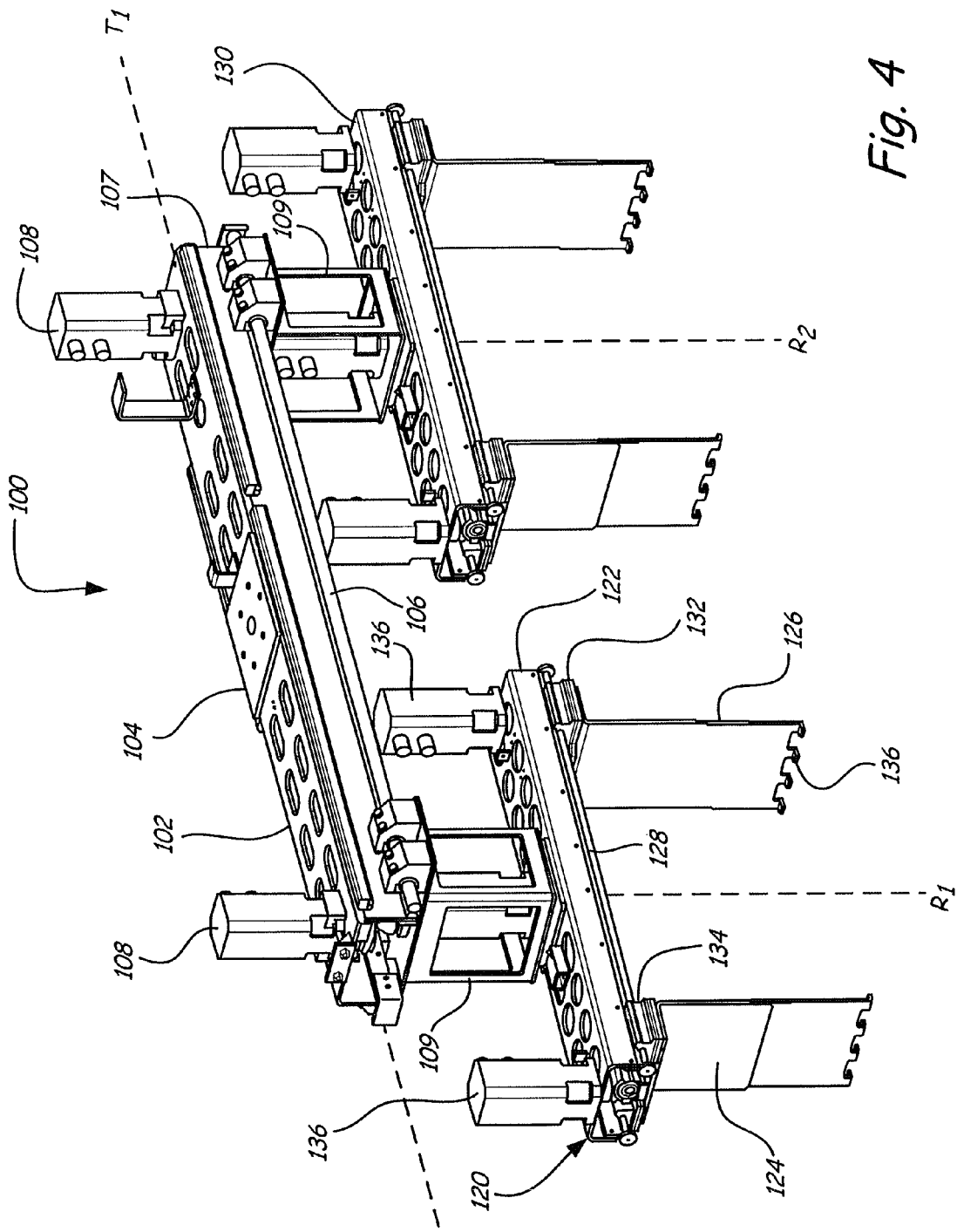
FIG. 4 is an isometric view of a gripping appliance in accordance with some embodiments.

FIG. 4 is an isometric view of the gripping appliance 100 in accordance with some embodiments. The gripping appliance 100 may include a horizontally oriented upper frame 102 coupled to a first gripper assembly 120 and a second gripper assembly 130. For example, as shown in FIG. 4, the upper frame 102 may be provided axially above the first and second gripper assemblies 120, 130 such that the first and second gripper assemblies 120, 130 are suspended below the upper frame 102. In illustrative implementations, the first and second gripper assemblies 120, 130 may be configured such they are selectively and independently movable relative to one another. More specifically, in one embodiment, the first and second gripper assemblies 120, 130 may be movable relative to one another along a translation axis T1 (e.g., right/left) and rotatable relative to one another about vertical axes R1 and R2, respectively. While the present disclosure is described with respect to embodiments wherein two gripper assemblies are coupled to the upper frame 102, it is to be appreciated that any number of gripper assemblies may be employed.

In some embodiments, upper frame 102 may be configured as an elongated, substantially hollow, rectangular member. Alternatively, upper frame 102 may be configured in any shape suitable for supporting a selected number of gripping assemblies. As shown, the longitudinal dimension of the upper frame 102 may define the translation axis T1. The upper frame 102 may include a mounting plate 104 disposed on a top surface thereof for attaching the gripping appliance 100 to a complementary mounting port of the movable arm 32. The upper frame 102 may further support tracks 106, which extend along opposed sides of the upper frame 102 substantially the length of the longitudinal dimension of the upper frame 102. To facilitate movement of the gripper assemblies 120, 130 along translation axis T1, the gripper assemblies 120, 130 may be coupled to carriages 109 that are movably mounted to the tracks 106 of the upper frame 102. The carriages 109 may be coupled to the tracks 106 by one or more guide elements 107 slidably arranged on the tracks 106.

In various implementations, upper frame 102 may accommodate one or more drive systems configured for applying translational movement to the gripper assemblies 120, 130 along the translation axis T1. For example, the upper frame 102 may accommodate, on opposed ends thereof, servo motors 108. The servo motors 108 may be operatively coupled to drive mechanisms provided within upper frame 102, which, in turn, may be operatively coupled to the carriages 109 such that the carriages 109 may be driven in either or both directions along the translation axis T1. In one embodiment, the gripper assemblies 120, 130 may be selectively movable in both directions along the translation axis T1 substantially the entire longitudinal dimension of the upper frame 102, independent of one another. Alternatively, the gripper assemblies 120, 130 may be movable in both directions along the translation axis T1 any selected portion of the longitudinal dimension of the upper frame 102.

In illustrative embodiments, the gripper assembly 120 and gripper assembly 130 may be configured to have substantially the same construction and operation. Accordingly, for purposes of simplification, only the gripper assembly 120 is described in detail. In some implementations, gripper assembly 120 may include a frame 122 for supporting a pair of opposed bundle clamp members 124, 126. Generally, the bundle clamps members 124, 126 are movable relative to one another along substantially the entire longitudinal dimension of the frame 122 to facilitate retrieving and depositing of bundles.

In illustrative embodiments, the frame 122, similar to the upper frame 102, may be configured as an elongated, substantially hollow, rectangular member. As shown, the frame 122 of the first gripper assembly 120 and the frame of the second gripper assembly 130 may extend in a common plane. Alternatively, the frames may extend in different, but parallel planes. The frame 122 may support tracks 128, which extend along opposed sides of the frame 122 substantially the length of the longitudinal dimension of the frame 122. To facilitate relative movement of the bundle clamp members 124, 126 along the longitudinal axis of the frame 122 (i.e., opening and closing of the bundle clamps), the bundle clamp members may be coupled to carriages 132 that are movably mounted to the tracks 128 of the frame 122. The carriages 132 may be coupled to the tracks 128 by one or more guide elements 134 slidably arranged on the tracks 128.

In various implementations, frame 122 may accommodate one or more drive systems configured for applying translational movement to the clamp members 124, 126 along a longitudinal axis of the frame 122. For example, the frame 122 may accommodate, on opposed ends thereof, servo motors 136. The servo motors 136 may be operatively coupled to drive mechanisms provided within upper frame 122, which, in turn, may be operatively coupled to the carriages 132 such that the carriages 132 may be driven in both directions along the translation axis T1. In one embodiment, the clamp members 124, 126 may be movable in both directions along a longitudinal axis of the frame 122 substantially the entire longitudinal dimension of the frame 122 between an open position and a closed position. A position of the clamp members 124, 126 relative to each other in which one or more bundles may be securely held therebetween may be referred to as the closed position. It is to be appreciated that the open and closed positions are dependent upon the number, dimensions, and/or geometry of the bundles being grasped.

In some embodiments, the frame 122 may accommodate one or more drive systems configured for applying rotational movement to the gripper assembly 120 relative to the upper frame 102, and thus the gripper assembly 130. In this regard, gripper assembly 120 may be coupled to the carriage 109 such that the gripper assembly 120 is rotatable relative to the upper frame 102. A servo motor 136 may be operatively coupled to a drive mechanism provided within frame 122 for applying rotational motion to the gripping assembly 120 about an axis R1. The drive mechanism associated with rotational motion of the gripping assembly 120 may be configured to allow for any suitable range of rotation, including but not limited to, for example, up to about 90 degrees, up to about 180 degrees, up to about 270 degrees, or up to about 360 degrees or more.

While the foregoing has been described with respect to embodiments in which the drive systems for applying translational and rotational movement to the gripper assembly are accommodated in the frame 22, it is to be appreciated that either or both of these drive systems may be accommodated in the upper frame 102 without deviating from the scope of the present disclosure.

In various implementations, the bundle clamp members 124, 126 may be configured as elongated plate-like members, having first ends coupled to carriages 132 and second ends terminating in a plurality of inwardly extending fork members 136. Alternatively, bundle clamps 124, 126 may be configured in any shape suitable for facilitating gripping/depositing of bundles. In further alternatives, an alternative type of gripping mechanism may be substituted for either or both the bundle clamps 124, 126 such as, for example, a suction device, a claw-like device, or the like.

Figure 5:
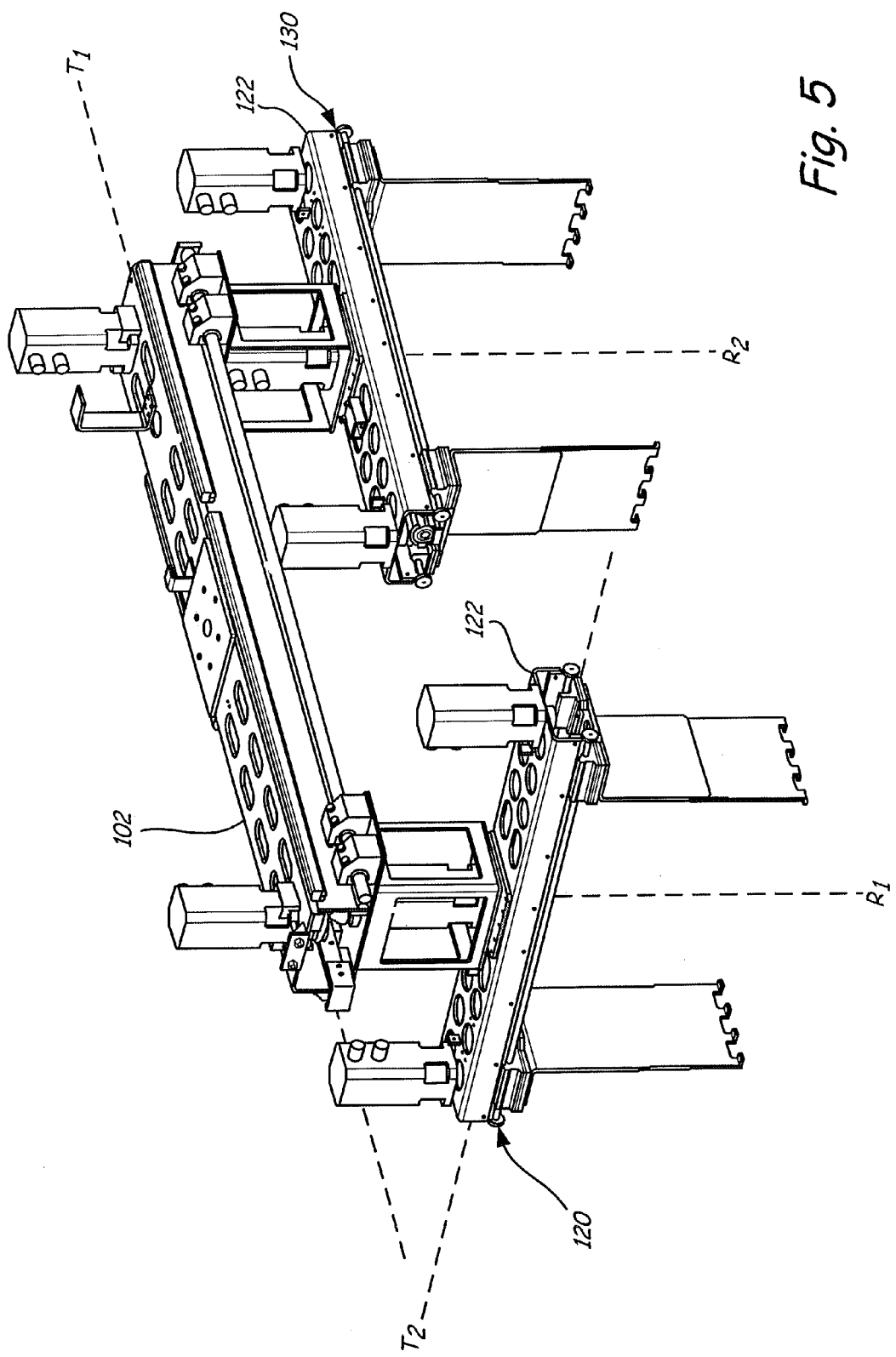
FIG. 5 is an isometric view of a gripping appliance in accordance with some embodiments.

Referring to FIGS. 4 and 5, the first and second gripper assemblies 120, 130, and thus bundles being carried by the first and second gripper assemblies 120, 130, may be rotated relative to one another about vertical axes R1 and R2, respectively, and moved relative to one another in a translation plane that extends substantially perpendicularly with respect to both of the rotational axes R1 and R2, and includes a second translational axis T2 (e.g., a plane that is extends substantially parallel to the surface supporting the robot 30). FIG. 5 is an isometric view of the gripping appliance 100 wherein the first gripper assembly 120 has been rotated 90 degrees relative to the upper frame 102 and gripper assembly 130. In illustrative embodiments, the frame 122, and thus tracks 128, may be longitudinally dimensioned such when the clamp members 124, 126 are in the closed position, the clamp members 124, 126 are positioned inwardly relative to the outwardmost position that they may achieve relative to the frame 122. That is, after clamping a selected number of bundles, the bundle clamps 124, 126 are movable relative to the frame 122 such that a bundle carried by the bundle clamps 124, 126 may be offset relative to the vertical axis R1. In this manner, relative movement of the bundles in the translation plane may be achieved by movement of the bundles held by gripper assembly 120 along the second translation axis T2 defined by the longitudinal dimension of the frame 122 of the gripper assembly 120, which is substantially perpendicular to the first translation axis (e.g., forwards/backwards). Although not depicted, upon rotation of the gripper assembly 130, forwards/backwards relative movement may be achieved by movement of the bundles held by gripper assembly 130 along a third translation axis (e.g., axis defined by the longitudinal dimension of the frame 122 of gripper assembly 130), which also lies in the translation plane.

In an alternative embodiment, an additional drive system configured for moving the gripping assembly 120 along axis T2 may be provided. For example, an additional servo motor, drive mechanism, and carriage combination may be accommodated in or on the frame 122 such that the gripping assembly 120 may be moved relative to the frame 102, and thus the gripping assembly 130, along the translation axis T2.

While the present disclosure has been described with respect to embodiments in which, when the gripper assemblies 120, 130 are offset 90 degrees relative to each other, one of the gripper assemblies 120, 130 is substantially perpendicular to the upper frame 102 (i.e., axis T2 is perpendicular to axis T1), it is to be appreciated that gripper assemblies 120, 130 may be offset 90 degrees relative to each other and positioned at any angle with respect to the upper frame 102.

Suitable materials for the components of gripping appliance 100 may include steel, aluminum, plastic, and the like. With regard to fastening, mounting, attaching or connecting the components of gripping appliance 100, unless specifically described as otherwise, conventional fasteners such as screws, rivets, toggles, pins and the like may be used. Other fastening or attachment means appropriate for connecting components include friction fitting, adhesives, welding and soldering, the latter particularly with regard to electrical or processing components or systems of the gripping appliance 100. Any suitable electronic, electrical, communication, computer or processing components may be used, such as to provide communication between the robot 30 and the gripping appliance 100, including any suitable electrical components and circuitry, light sources, wires, wireless components, sensors, chips, boards, micro-processing or control system components, software, firmware, hardware, and the like.

Figure 6:
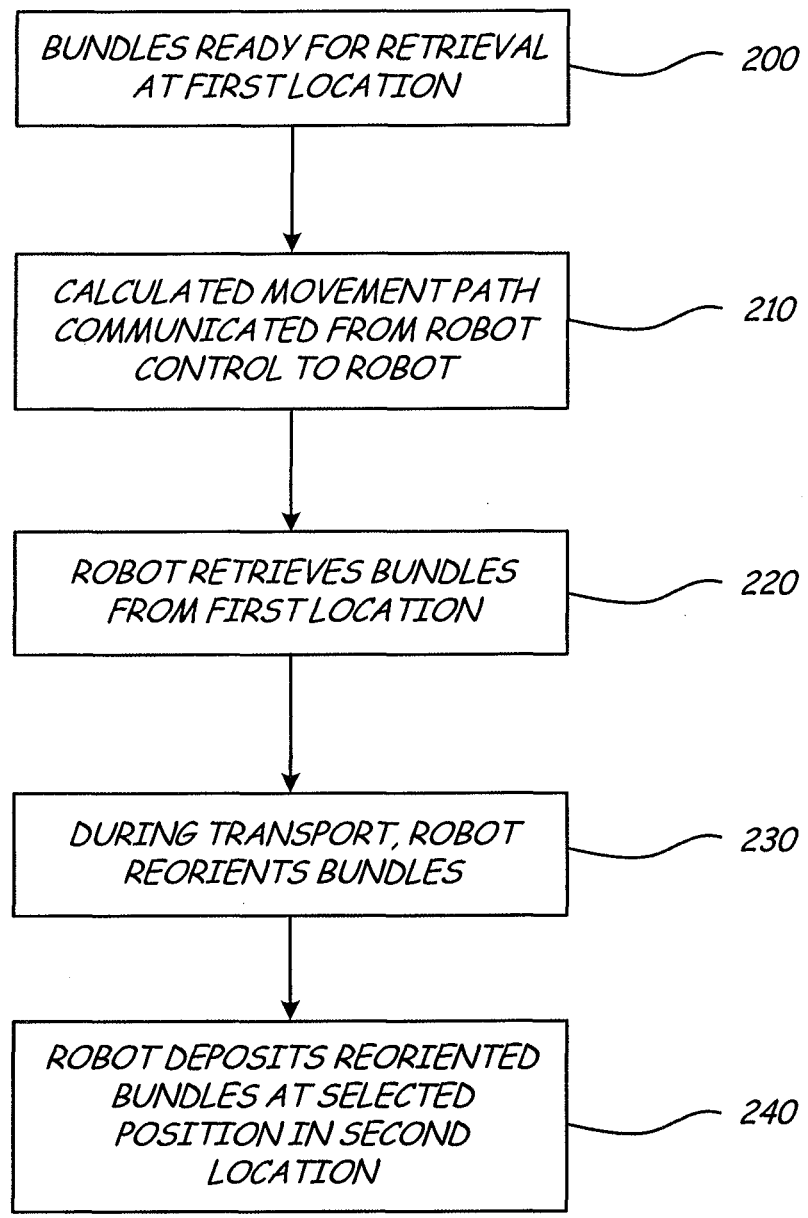
FIG. 6 is a flow diagram illustrating a process for transporting bundles according to some embodiments.

In operation, the robot control 31 may be programmed to cause the robot 30, including the robot arm 32 and the gripping appliance 100, to grasp and move a selected number of bundles in order to create a stack of bundles having a predetermined layer pattern. FIG. 6 is a flow diagram illustrating a process for transporting bundles to form a stack of bundles having a predetermined layer pattern in accordance with one embodiment. Initially, the robot control 31 may be alerted, such as by one or more position sensors in communication with the robot control 31, that one or more bundles are in a preselected position in the bundle acquisition zone 24, indicating that the bundles are ready for retrieval by the robot 30 (block 200). As discussed above, a preselected position may comprise a row of a selected number of bundles oriented substantially head to tail. Once bundles are detected, a calculated movement path may be sent from the robot controller 32 to the to the robot 30 (block 210). The movement path may, for example, define a series of points and/or movements that are calculated by the robot controller 32 in response to any or all of the preselected position of the bundles in the bundle acquisition zone 24, the dimensions and geometry of the bundles, the selected layer pattern, and the like. Next, the robot 30 may pick-up the bundles via the gripping appliance 100 and begin moving the bundles to a selected location such as, for example, the stack build zone 42 (block 220). For example, each of the first and second gripping assemblies 120, 130 may retrieve one or more bundles from the bundle acquisition zone 24. It is to be appreciated that such retrieval may, but need not necessarily, be simultaneous (i.e, the gripping assemblies 120, 130 may grasp their respective bundle(s) at substantially the same time or at different times). During transport of the bundles from the bundles acquisition zone 24 to the stack build zone 42, based on the movement path, the robot 30, through manipulation of the components of the gripping appliance 100 (e.g., first and second gripper assemblies 120, 130), may reorient the bundles (block 230). As discussed above, in some embodiments, reorientation may include rotation of the bundles relative to one another, as well as movement of bundles in a translation plane relative to one another. Finally, the robot 30 may deposit the reoriented bundles at a selected location in the stack build zone 42 (block 240). After depositing of the bundles in the stack build zone 42, the process may return to the step of block 200. The process may be repeated until the stacking pattern is completed.

Completion of the sequence of operations discussed with respect to the process of FIG. 6 may be referred to as a transport cycle. That is, each time the robot retrieves bundles from a first location and deposits the bundles at a second location, the robot has completed a transport cycle. In some embodiments, depending on, for example, the dimensions and geometry of the bundles and/or the selected layer pattern, a layer may be completed in one or more transport cycles.

Figure 7:
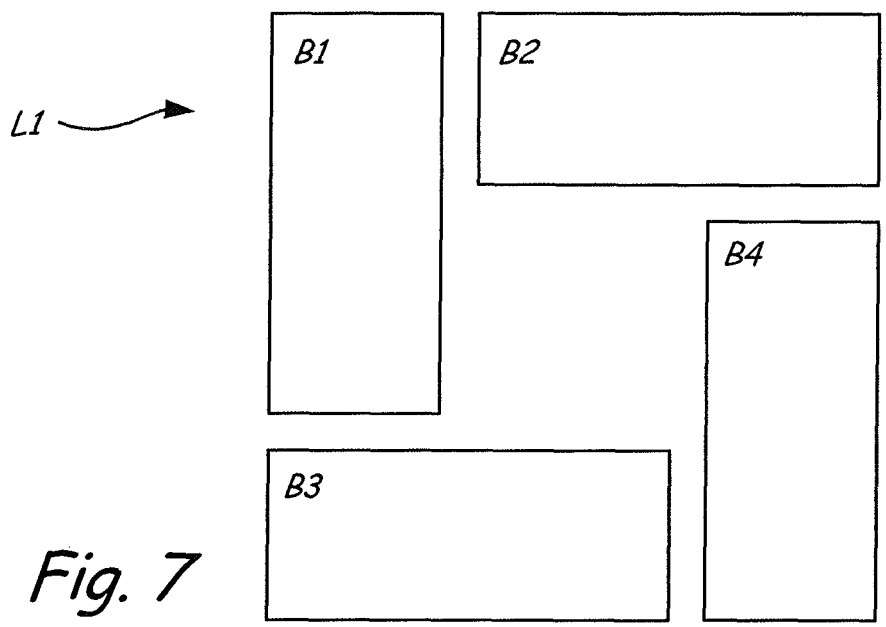
FIG. 7 is a schematic of a layer pattern which may be formed according to some embodiments.

FIG. 7 depicts a schematic of a layer pattern L1 which may be formed in two transport cycles using the robot 30 and gripping appliance 100 described herein. Particularly, in a first transport cycle, the gripping assembly 120 may retrieve a first bundle B1 and the gripping assembly 130 may retrieve a second bundle B2 of a row of two bundles which are positioned substantially head to tail at a first location. During transport of the bundles to a second location, the gripping assembly 120 may move the bundle B1 in a first direction along a first translation axis in a translation plane (e.g., axis T2 of FIG. 5) relative to the bundle B2, and the gripping assembly 130 may rotate the bundle B2 approximately 90 degrees relative to the bundle B1. The robot 30 may then deposit the bundles B1, B2 at the second location. In a second transport cycle, the gripping assembly 120 may retrieve a third bundle B3 and the gripping assembly 130 may retrieve a fourth bundle B4 of a row of two bundles which are positioned substantially head to tail at the first location. During transport of the bundles to the second location, the gripping assembly 120 may rotate the bundle B3 approximately 90 degrees relative to the bundle B4, and the gripping assembly 130 may move the bundle B4 in a second direction along a second horizontal axis in the translation plane relative to the bundle B3, the second direction being generally opposite the first direction and the second translation axis being generally parallel to the first translation axis. The robot 30 may then deposit the bundles B3, B4 at the second location to complete the layer pattern L1. It is to be appreciated that the respective movements of the gripping assemblies 120, 130 during a transport cycle may be carried out in series or in parallel.

Figure 8:
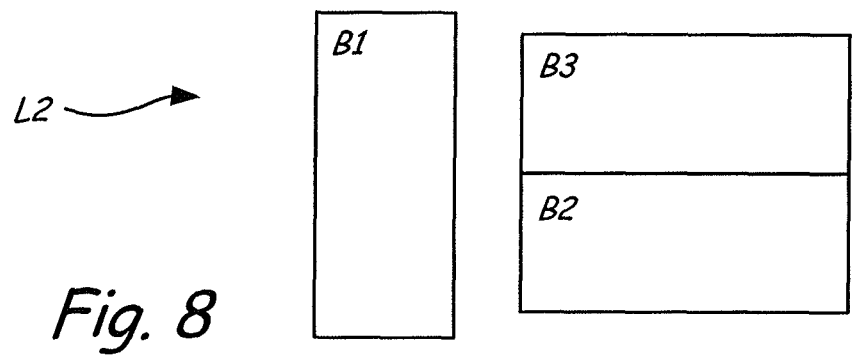
FIG. 8 is a schematic of a layer pattern which may be formed according to some embodiments.

FIG. 8 depicts a schematic of a layer pattern L2 which may be formed in one transport cycle using the robot 30 and gripping appliance 100 described herein. Particularly, in a first transport cycle, the gripping assembly 120 may retrieve a first bundle B1 and the gripping assembly 130 may retrieve second and third bundles B2, B3 of a row of three bundles which are positioned substantially head to tail at a first location. During transport of the bundles to a second location, the gripping assembly 130 may rotate the bundles B2, B3 approximately 90 degrees relative to the bundle B1. The robot 30 may then deposit the bundles B1, B2 at a second location to form the layer pattern L2.

Figure 9:
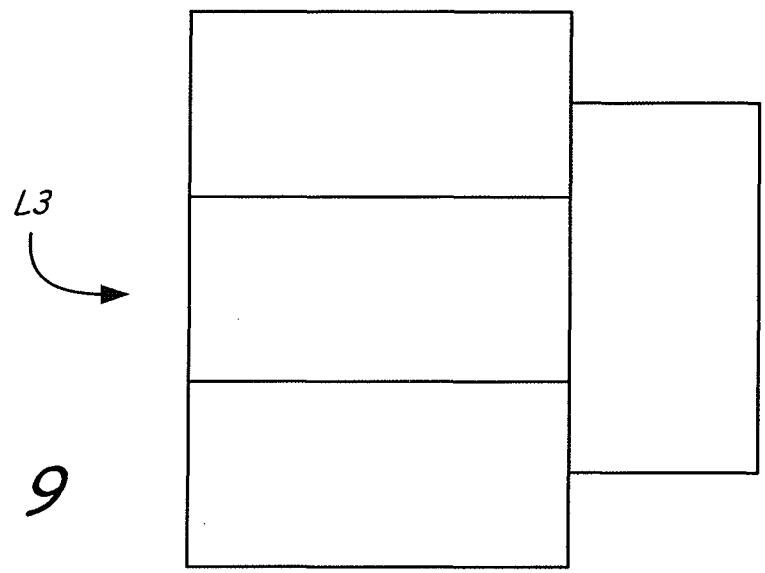
FIG. 9 is a schematic of a layer pattern which may be formed according to some embodiments.
Figure 10:
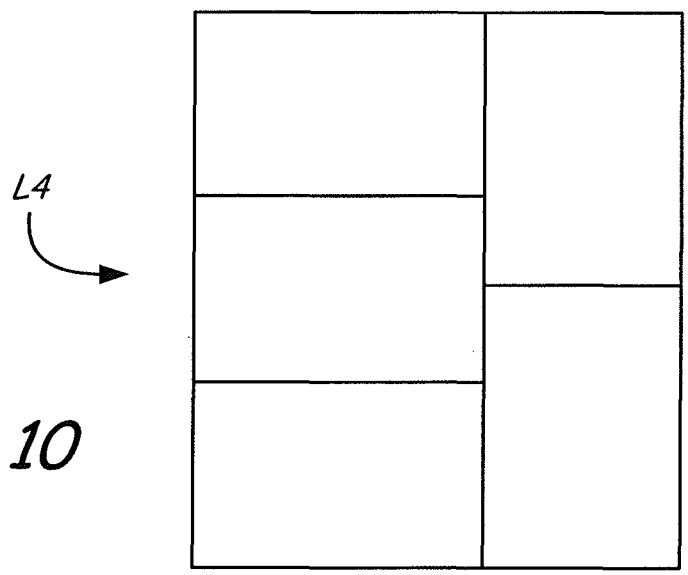
FIG. 10 is a schematic of a layer pattern which may be formed according to some embodiments.

FIGS. 9-10 depict further examples of layer patterns, L3 and L4, respectively, that may be formed using the robot 30 and gripping appliance 100 described herein. As will be appreciated by those skilled in the art, a multitude of additional layer patterns may be formed employing the systems and methods described herein.

Although the present invention has been described with reference to preferred embodiments, persons skilled in the art will recognize that changes may be made in form and detail without departing from the spirit and scope of the invention.

We claim:

1. A method for forming layered stacks of bundles comprising:

providing a gripping appliance coupled to a single movable robotic arm, the gripping appliance comprising a first gripping assembly and a second gripping assembly, wherein the first gripping assembly is configured for grasping one or more first bundles in a first stack thereof, said first stack being held at edges of a lowest bundle in said first stack, and the second gripping assembly is configured for grasping one or more second bundles in a second stack thereof, said second stack being held at edges of a lowest bundle in said second stack, and wherein the first and second gripping assemblies are configured such that first and second bundles grasped thereby may be reoriented and linearly translated relative to one another, wherein at least one of said first and second gripping assemblies are linearly translatable along said gripping appliance past a midpoint thereof;

retrieving from a first location one or more first bundles with the first gripping assembly and one or more second bundles with the second gripping assembly, said first gripping assembly operating with a sufficient force to hold said first bundles while moving said first bundles along a calculated path, and said second gripping assembly operating with a sufficient force to hold said second bundles while moving said second bundles along said calculated path;

transporting the first and second bundles to a second location by at least a movement of the single movable robotic arm, wherein during transporting of the first and second bundles, the first and second bundles are reoriented and linearly translated relative to one another; and depositing the first and second bundles at a selected position in the second location to form at least a partial layer of a layered stack of bundles.

2. The method for forming stacks of bundles according to claim 1, wherein
reorienting the first and second bundles relative to one another comprises rotating either or both of the first and second bundles relative to one another about one or more vertical axes.

3. The method for forming stacks of bundles according to claim 2, wherein
reorienting the first and second bundles relative to one another comprises moving either or both of the first and second bundles relative to one another in a translation plane.

4. The method for forming stacks of bundles according to claim 3, wherein
the translation plane passes through and extends substantially perpendicularly with respect to the vertical axes.

5. The method for forming stacks of bundles according to claim 4, wherein
reorienting the first and second bundles relative to one another comprises moving the first and second bundles relative to one another in at least two directions in the translation plane, the at least two directions being substantially perpendicular relative to one another.

6. The method for forming stacks of bundles according to claim 1, wherein
reorienting the first and second bundles relative to one another comprises moving either or both of the first and second bundles relative to one another in a translation plane.

7. A system for forming layered stacks of bundles comprising:
a first conveyor configured for transferring bundles to a bundle acquisition zone;
a second conveyor configured for transferring layered stacks of the bundles from a stack build zone;
a robot comprising a movable arm configured to transport bundles from the bundle acquisition zone to the stack build zone;
a gripping appliance coupled to the movable arm, the gripping appliance comprising a first gripping assembly and a second gripping assembly, wherein the first gripping assembly is configured for grasping one or more first bundles from the bundle acquisition zone and the second gripping assembly is configured for grasping one or more second bundles from the bundle acquisition zone; and
wherein the first and second gripping assemblies are configured such that first and second bundles grasped thereby may be reoriented and linearly translated relative to one another during transport of the bundles from the bundle acquisition zone to the stack build zone,
wherein at least one of said first and second gripping assemblies are linearly translatable along said gripping appliance past a midpoint thereof.

8. A system as in claim 7, wherein
reorienting the first and second bundles relative to one another comprises rotating either or both of the first and second bundles relative to one another about one or more vertical axes.

9. A system as claim 8, wherein
reorienting the first and second bundles relative to one another comprises moving either or both of the first and second bundles relative to one another in a translation plane.

10. A system as in claim 9, wherein
the translation plane passes through and extends substantially perpendicularly with respect to the vertical axes.

11. A system as in claim 10, wherein
reorienting the first and second bundles relative to one another comprises moving the first and second bundles relative to one another in at least two directions in the translation plane, the at least two directions being substantially perpendicular relative to one another.

12. A system as in claim 7, wherein
reorienting the first and second bundles relative to one another comprises moving either or both of the first and second bundles relative to one another in a translation plane.

13. A gripping assembly comprising:
an elongated base frame;
a first gripper movably coupled to the base frame such that the first gripper is translatable along a longitudinal dimension of the base frame and rotatable relative to the base frame, the first gripper comprising an elongated first frame having one or more first clamp members movably coupled to the first frame;
a second gripper movably coupled to the base frame such that the second gripper is translatable along the longitudinal dimension of the base frame, the second gripper comprising an elongated second frame having one or more second clamp members movably coupled to the second frame;
wherein at least one of said first gripper and said second gripper are translatable along said longitudinal dimension of said base frame when rotated relative to said base frame;
wherein at least one of said first gripper and said second gripper are translatable along said longitudinal dimension of said base frame past a midpoint thereof;
one or more first drive systems coupled to either or both of the first and second grippers for driving the translational movement of the first and second grippers; and
one or more second drive systems coupled to either or both of the first and second grippers for driving the rotational movement of the first and second grippers.

14. The gripper assembly according to claim 13, wherein
the first and second grippers are coupled to the base frame such the first and second frames are suspended axially below the base frame.

15. The gripper assembly according to claim 14, wherein
the first and second frames extend in the same plane or parallel planes.

16. The gripper assembly according to claim 13, wherein
the first gripper comprises a pair of opposed clamp members coupled to the first gripper such that the clamp members are translatable along the longitudinal dimension of the first frame.

17. The gripper assembly according to claim 13, wherein
the one or more first drive systems are configured such that the first and second grippers are independently translatable relative to one another.

18. The gripper assembly according to claim 13, wherein the one or more second drive systems are configured such that the first and second grippers are independently rotatable relative to one another.

* * * * *